(12) United States Patent
Martin et al.

(10) Patent No.: US 9,883,110 B2
(45) Date of Patent: Jan. 30, 2018

(54) TOGGLING BETWEEN AUGMENTED REALITY VIEW AND RENDERED VIEW MODES TO PROVIDE AN ENRICHED USER EXPERIENCE

(71) Applicants: Margaret A. Martin, Atlanta, GA (US); Alex S. Hill, Charleston, SC (US); Harrison D. Leach, Smyrna, GA (US)

(72) Inventors: Margaret A. Martin, Atlanta, GA (US); Alex S. Hill, Charleston, SC (US); Harrison D. Leach, Smyrna, GA (US)

(73) Assignee: CNZ, Inc., Atlanta, GA (US)

( * ) Notice: Subject to any disclaimer, the term of this patent is extended or adjusted under 35 U.S.C. 154(b) by 112 days.

(21) Appl. No.: 15/148,002

(22) Filed: May 6, 2016

(65) Prior Publication Data
US 2016/0330380 A1    Nov. 10, 2016

Related U.S. Application Data

(60) Provisional application No. 62/159,232, filed on May 9, 2015.

(51) Int. Cl.
| | |
|---|---|
| *G09G 5/00* | (2006.01) |
| *H04N 5/232* | (2006.01) |
| *G06T 19/00* | (2011.01) |
| *G06F 3/0488* | (2013.01) |

(52) U.S. Cl.
CPC ....... *H04N 5/23293* (2013.01); *G06F 3/0488* (2013.01); *G06T 19/006* (2013.01)

(58) Field of Classification Search
CPC .. G06T 19/006; H04N 5/23293; G06F 3/0488
USPC ......................................... 345/633
See application file for complete search history.

(56) References Cited

U.S. PATENT DOCUMENTS

| | | | | |
|---|---|---|---|---|
| 9,007,400 B2* | 4/2015 | Takahashi | ............... | G06T 11/00 |
| | | | | 345/633 |
| 9,761,045 B1* | 9/2017 | Cote | ....................... | G06T 17/10 |
| 2003/0210832 A1* | 11/2003 | Benton | .................... | G06T 15/20 |
| | | | | 382/284 |
| 2014/0247278 A1* | 9/2014 | Samara | .............. | G06K 17/0016 |
| | | | | 345/633 |
| 2015/0123966 A1* | 5/2015 | Newman | ............... | G06T 19/006 |
| | | | | 345/419 |

(Continued)

Primary Examiner — Ryan R Yang
(74) Attorney, Agent, or Firm — H. Brock Kolls

(57) ABSTRACT

The present invention relates to a camera enabled mobile device and method of toggling between an augmented reality image viewing mode and a rendered image viewing mode based, in part, on viewability of an augmented reality target (visible or invisible—markerless) proximate the camera enabled mobile device. The method comprising steps of positioning at least one of an augmented reality target in a physical location, aiming the camera at the augmented reality target, initiating, once, an immersive user software experience, determining which of the augmented reality appliance images and the rendered appliance images are associated with the augmented reality target, then toggling between the augmented reality image viewing mode when the augmented reality target is viewable by the camera else entering the rendered image viewing mode.

23 Claims, 7 Drawing Sheets

(56) References Cited

U.S. PATENT DOCUMENTS

2016/0253840 A1\* 9/2016 Lee .................. G06T 19/003
                                                    345/633
2016/0253843 A1\* 9/2016 Lee .................. G06F 3/04815
                                                    345/633
2016/0314624 A1\* 10/2016 Li ..................... G06F 1/163
2017/0109916 A1\* 4/2017 Kurz ................. G06T 11/60

\* cited by examiner

TOGGLING BETWEEN AUGMENTED REALITY VIEW AND RENDERED VIEW MODES TO PROVIDE AN ENRICHED USER EXPERIENCE

CROSS-REFERENCE TO RELATED APPLICATIONS

This application contains subject matter which is related to the subject matter of the following co-pending application. The below listed application is hereby incorporated herein by reference in its entirety:

This is a U.S. non-provisional application that claims the benefit of a U.S. provisional application, Ser. No. 62/159,232, inventor Margaret A. Martin et al., entitled "TOGGLING BETWEEN AUGMENTED REALITY VIEW AND RENDERED VIEW MODES TO PROVIDE AN ENRICHED USER EXPERIENCE", filed May 9, 2015.

TECHNICAL FIELD OF THE INVENTION

This invention relates to a camera enabled mobile device and method of toggling between an augmented reality image viewing mode and a rendered image viewing mode based, in part, on viewability of an augmented reality target proximate the camera enabled mobile device; and particularly to a method comprising the steps of positioning at least one of an augmented reality target in a physical location, aiming the camera at the augmented reality target, initiating, once, an immersive user software experience, determining which of the augmented reality appliance images and the rendered appliance images are associated with the augmented reality target, toggling between the augmented reality image viewing mode when the augmented reality target is viewable by the camera else entering the rendered image viewing mode.

BACKGROUND OF THE INVENTION

Before our invention augmented reality markers were commonly used to trigger an augmented reality experience to start or be initiated on a mobile device. In this regard, as long as the mobile device could "see" and recognize the marker the augmented reality experience continued to display and be viewable to a user. This would typically continue until the marker was no long visible to, or recognized by, the mobile device and without the marker, as a reference, the experience would stop and often be no longer viewable to the user.

To restart the augmented reality experience the user would have to reacquire, "see", the marker again with the mobile device and then the augmented reality experience would be re-triggered and start over.

A shortcoming is that losing recognition of the marker caused the augmented reality experience to stop and regaining the marker recognition caused the augmented reality experience to start over, often forcing the user to redo from the beginning whatever they might have started in the way of interacting with the augmented reality experience.

Another shortcoming is that when a marker, including invisible markers, must be recognized in order to keep an augmented reality experience continuously executing, it can make it difficult for a user to interact with the mobile device. In this regard, the user must often hold the mobile device to insure the marker will be recognized, often requiring placement and steadiness of the mobile device at awkward handheld angles, in the user's hand, at steep vertical inclines, for extended periods of time, making it difficult to use the mobile device, without losing recognition of the marker. As such, it can be difficult to use the mobile device for both meaningful work and augmented reality at the same time.

Other experiences utilize the marker to trigger the augmented reality experience but then, at some point, redirect the user to a webpage or other non-augmented reality site or application. In this regard, in these types of experiences, when recognition of the marker is "lost" after redirection there is no way back to the augmented reality portion of the experience. As such, another shortcoming is that the user cannot return seamlessly to the augmented reality experience from a redirected experience.

For these reasons and shortcomings as well as for other reasons and shortcomings there is a long felt need to be able to acquire a marker, once, to initiate an augmented reality experience and then be able to toggle between an augmented reality image viewing mode and a rendered image viewing mode so that the user can maintain an uninterrupted viewing when the marker is "lost" or otherwise unrecognizable. This ability can improve the usability of augmented reality experiences by allowing the user to set down a mobile device and continue the experience. This ability can also aid users of wearable augmented reality devices by allowing them to continue to view the experience without requiring that they maintain an optimal view of the augmented reality marker.

SUMMARY OF THE INVENTION

The shortcomings of the prior art are overcome and additional advantages are provided through the provision of a method of toggling between an augmented reality image viewing mode and a rendered image viewing mode based, in part, on viewability of an augmented reality target proximate a camera enabled mobile device. The method comprising the steps of positioning at least one of an augmented reality target in a physical location, each of the augmented reality targets is uniquely associated with at least one of an augmented reality appliance image representation of an appliance and at least one of a rendered appliance image representation of the appliance, the camera equipped mobile device further comprising a microprocessor, a camera, and a display, the camera and the display are operationally related to the microprocessor. Aiming the camera at the augmented reality target. Initiating, once, an immersive user software experience, by way of the camera detection of the augmented reality target within the physical location, wherein the immersive user software experience becomes operable by a user. Determining which of the augmented reality appliance images and the rendered appliance images are associated with the augmented reality target. Toggling between the augmented reality image viewing mode and the rendered image viewing mode, as follows: presenting, in the augmented reality image viewing mode, the augmented reality appliance image overlaid with the camera image of the physical location, viewable by the user, on the display, when the augmented reality target is viewable by the camera or presenting, in the rendered image viewing mode, the rendered appliance image viewable by the user, on the display, when the augmented reality target is not viewable by the camera. Then engendering the user to interact with the immersive user software experience and selectively adjust at least one of an experience parameter, and returning to the step of toggling.

Additional shortcomings of the prior art are overcome and additional advantages are provided through the provision of a camera enable mobile device toggles between an augmented reality image viewing mode and a rendered image viewing mode based, in part, on viewability of an augmented reality target proximate the camera enabled mobile device. The camera enable mobile device comprising a microprocessor, a display operationally related with the microprocessor, a camera operationally related with the microprocessor, and a microprocessor readable memory. The microprocessor readable memory is encoded with instructions that when executed perform the steps of initiating, once, an immersive user software experience, by way of the camera detection of the augmented reality target within the physical location, wherein the immersive user software experience becomes operable by a user, each of the augmented reality targets is uniquely associated with at least one of an augmented reality appliance image representation of an appliance and at least one of a rendered appliance image representation of the appliance. Determining which of the augmented reality appliance images and the rendered appliance images are associated with the augmented reality target. Toggling between the augmented reality image viewing mode and the rendered image viewing mode, as follows: presenting, in the augmented reality image viewing mode, the augmented reality appliance image overlaid with the camera image of the physical location, viewable by the user, on the display, when the augmented reality target is viewable by the camera or presenting, in the rendered image viewing mode, the rendered appliance image viewable by the user, on the display, when the augmented reality target is not viewable by the camera. Then engendering the user to interact with the immersive user software experience and selectively adjust at least one of an experience parameter, and returning to the step of toggling.

Additional shortcomings of the prior art are overcome and additional advantages are provided through the provision of a method of toggling between an augmented reality image viewing mode and a rendered image viewing mode based, in part, on viewability of an augmented reality target proximate a camera enabled mobile device. The method comprising the steps of positioning at least one of an augmented reality target in a physical location, each of the augmented reality targets is uniquely associated with at least one of an augmented reality appliance image representation of an appliance and at least one of a rendered appliance image representation of the appliance, the camera equipped mobile device further comprising a microprocessor, a camera, and a display, the camera and the display are operationally related to the microprocessor. Aiming the camera at the augmented reality target. Initiating, once, an immersive user software experience, by way of the camera detection of the augmented reality target within the physical location, wherein the immersive user software experience becomes operable by a user. Determining which of the augmented reality appliance images and the rendered appliance images are associated with the augmented reality target. Toggling between the augmented reality image viewing mode and the rendered image viewing mode, as follows: presenting, in the augmented reality image viewing mode, the augmented reality appliance image overlaid with the camera image of the physical location, viewable by the user, on the display, when the augmented reality target is viewable by the camera or presenting, in the rendered image viewing mode, the rendered appliance image viewable by the user, on the display, when the augmented reality target is not viewable by the camera. Then engendering the user to interact with the immersive user software experience and selectively adjust at least one of an experience parameter, the step of engendering further comprising: allowing a floating label to be positioned and affixed on the rendered appliance image and affixing, automatically, without intervention by the user, the floating label in same location on the augmented reality appliance image, wherein the floating label is viewable in both the augmented reality image viewing mode and the rendered image viewing mode. Then allowing the user to exploit certain of the experience parameters as to entice a customer to effectuate a transaction which allows the appliance to be placed in the physical location by visualizing, on the display, through the use of the augmented reality appliance images what the appliance would look like in the physical location and returning to the step of toggling.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
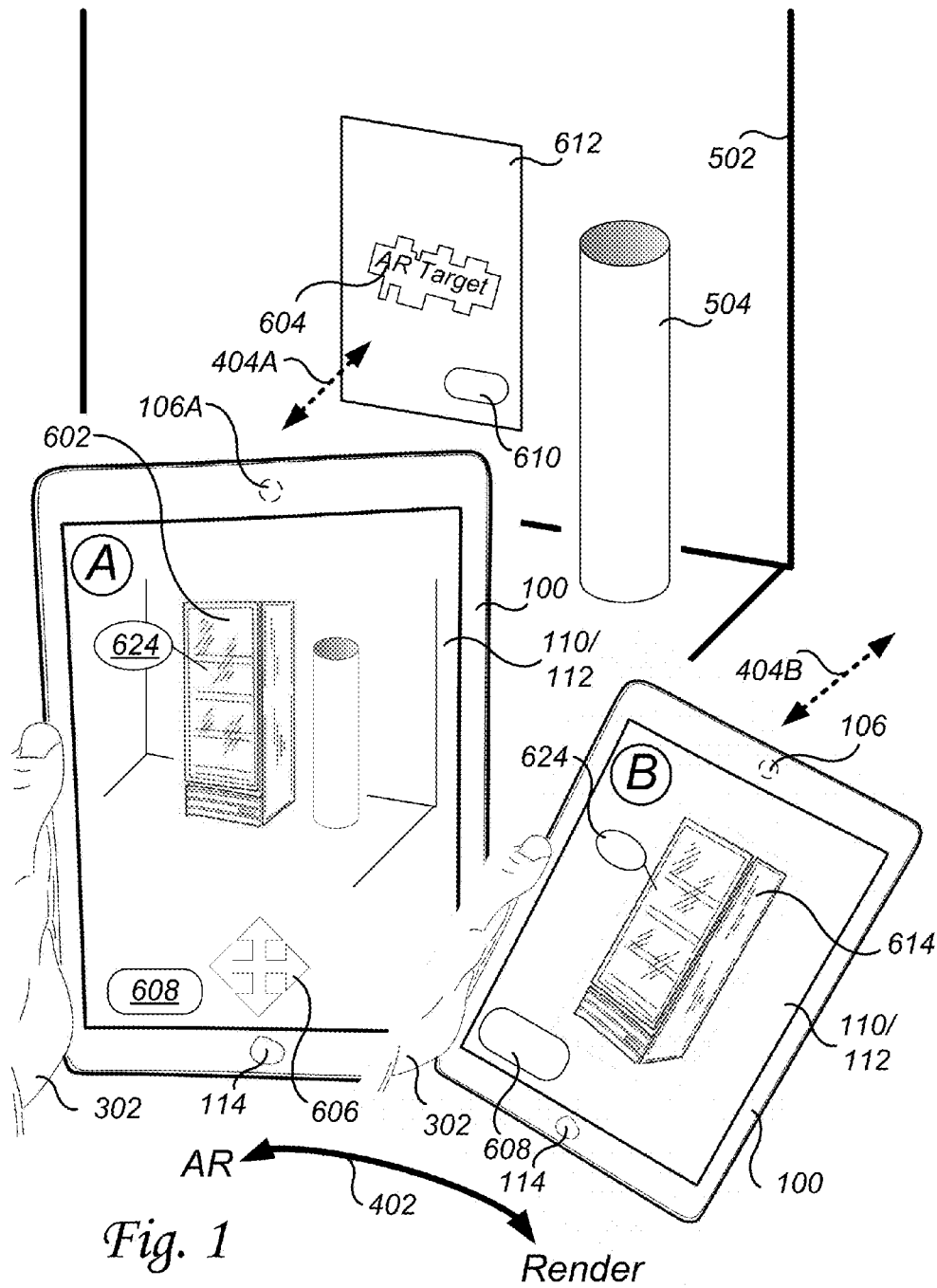
FIG. 1 illustrates one example of a camera enabled mobile device toggling between an augmented reality image viewing mode and a rendered image viewing mode.

Turning now to the drawings in greater detail, it will be seen that in FIG. 1 there is illustrated one example of a camera enabled mobile device 100 toggling between an augmented reality image viewing mode 404A and a rendered image viewing mode 404B. Illustrated in the Figure are a physical location 502 and a graphical representation of the physical location shown on display 112. Also illustrates is physical object 504 and a graphical representation of the physical object 504 shown on a display 112. On a wall associated with the physical location 502 is an augmented reality target 604. Such augmented reality target 604 can be, as an example and not a limitation, printed on paper, such as paper 612. In an exemplary embodiment, also printed on the paper can be instructions 610, such instructions can be, for example and not a limitation, how to download the immersive user software experience onto the camera enabled mobile device 100, how to use the immersive consumer software experience, how to position or place the augmented reality target 604 at the physical location 502, and/or other types and/or kinds of instructions and general indicia, as may be required and/or desired in a particular embodiment.

In an exemplary embodiment, the camera enabled mobile device can toggle between an augmented reality image viewing mode 404A and a rendered image viewing mode 404B based, in part, on viewability of an augmented reality target 604 proximate the camera enabled mobile device 100.

Use of the term "augmented reality image viewing mode" or "augmented reality image viewing mode 404A", in the present invention, is intended to mean, with reference to at least FIG. 1, a mode of operation, labeled 'A', when the camera enabled mobile device camera 100 has augmented reality target image viewing mode, line of sight 404A, wherein the augmented reality target 604 is visualized and recognize, in a manner, which effectuates the immersive user software experience to present an augmented reality view of augmented reality appliance image 602, representation of an appliance 702, on the display 112 of the camera enabled mobile device 100. In addition, in an exemplary embodiment, the camera enabled mobile device 100 can possess the ability to data communicate such images to a remote attendant 802. For disclosure purposes, augmented reality image viewing mode can be referred to as the augmented reality image viewing mode 404A just as a way of denoting that line of sight 404A to the augmented reality target 604 is required in this viewing mode.

Use of the term "rendered image viewing mode" or "rendered image viewing mode 404B", in the present invention, is intended to mean, with reference to at least FIG. 1, a mode of operation, labeled 'B', when the camera enabled mobile device 100 has a line of sight 404B away from the augmented reality target 604, wherein the augmented reality target 604 is either not viewable and/or not recognizable by camera 106. Absent augmented reality target 604 recognition, by the camera 106, the immersive user software experience effectuates a rendered appliance image 614, representation of an appliance 702, on the display 112 of the camera enabled mobile device 100. In addition, in an exemplary embodiment, the camera enabled mobile device 100 can possess the ability to data communicate such images to a remote attendant 802. For disclosure purposes, rendered image viewing mode can be referred to as the rendered image viewing mode 404B just as a way of denoting that line of sight 404B, away from the augmented reality target 604 is a characteristic of this viewing mode.

Use of the term "aiming", in the present invention, is intended to mean pointing, positioning, looking, or otherwise orientating the camera enabled mobile device to view the augmented reality target 604.

Use of the term "camera image", in the present invention, is intended to mean, still or moving images. In general, a moving camera feed is visualized and utilized and can be referred to as a video feed, a video stream, a moving image, a continuous series of captured images, and/or a captured image.

An advantage, in the present invention, of being able to toggle between the augmented reality image viewing mode, labeled 'A', with line of sight 404A, of the augmented reality target 604, and the rendered image viewing mode, labeled 'B', with line of sight 404B, away from the augmented reality target 604, is that the immersive user software experience can provide a more enriched and continuous engagement with the user 302, whether or not the camera is focused on the augmented reality target 604 all the time. In an exemplary embodiment, a user can acquire or otherwise recognize the augmented reality target 604 and visualize the augmented reality appliance image 602, representation of an appliance 702, on display 112. Once visualized, the user 302 can then move the camera enabled mobile device 100 away from the augmented reality target 604, wherein the immersive user software experience now toggles to the render mode and the user 302 now visualizes the rendered appliance image 614, representation of the appliance 702, on display 112.

If the user so chooses they can point the camera back at the augmented reality target 604, line of sight 404A and the immersive user software experience toggles back to augmented reality image viewing mode 404A allowing the user to visualize the augmented reality augmented reality appliance image 602, representation of an appliance 702 again. This toggling can persist as long as the user desires and changes between line of sight 404A and 404B.

In addition, manually, the user can press a button 114 or touch screen 110 and toggle between the augmented reality image viewing mode, labeled 'A', and the rendered image viewing mode, labeled 'B', provided that when toggling to the augmented reality viewing mode, labeled 'A', the camera 106 has line of sight 404A restored to recognize the augmented reality target 604.

For disclosure purposes 'AR' and 'Render' labeled motion arrow 402 illustrates, in at least FIG. 1, how the toggling occurs when the movement of the camera 106 line of sight changes between line of sight 404A and 404B to effectuate toggling between the augmented reality image viewing mode, labeled 'A', and the rendered image viewing mode, labeled 'B'.

Figure 3:
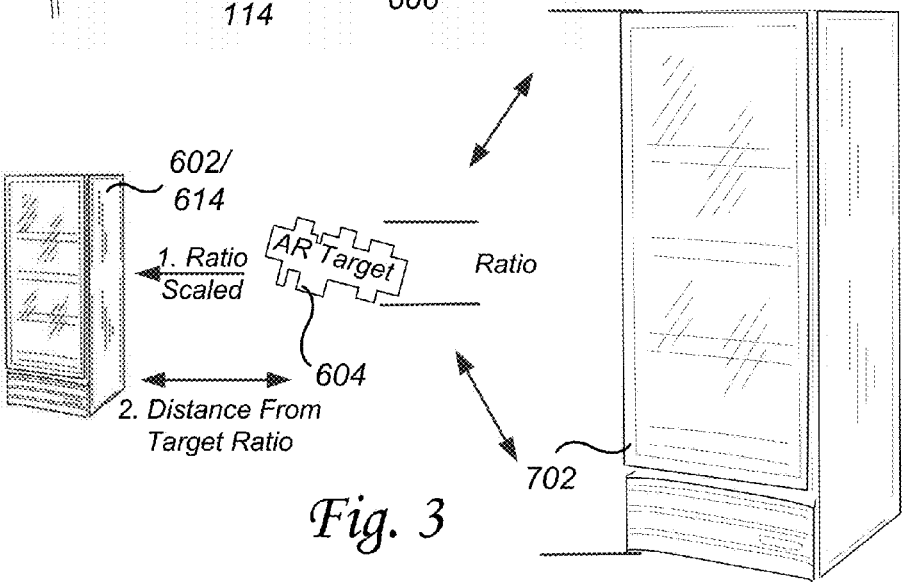
FIG. 3 illustrates one example of an appliance and ratio measurements with the augmented reality target.

The camera enabled mobile device 100 further comprises a microprocessor 102, a microprocessor readable memory 104, a camera 106, a wireless communications interface 108, a touch screen 110, a display 112, and at least one button 114, each of which is better illustrated in at least FIG. 3.

The microprocessor memory 104 is operationally related to the microprocessor 102 and is encoded with instructions that can be referred to as software, application, program, and/or an immersive user software experience. When the instructions are executed the immersive user software experience, is initiated, once, by way of the camera 106 detection of the augmented reality target 604, within the physical location 502. The immersive user software experience becomes operable by a user 302. In an exemplary embodiment, each of the augmented reality targets 604 is uniquely associated with at least one of an augmented reality appliance image 602, representation of an appliance 702, and at least one of a rendered appliance image 614, representation of the appliance 702.

Use of the term "appliance" or "appliance 702", in the present invention, is intended to mean any piece of equipment or an object such as a refrigerated cooler, stove, motor, pipe assembly, chair, desk, or generally any type or kind of furnishing, equipment, streets, building, other structures, and/or other object, as may be required and/or desired in a particular embodiment.

Use of the term "augmented reality appliance image" or "augmented reality appliance image 602", in the present invention, is intended to mean a three dimensional graphical representation tailored for augmented reality display overlaid on a camera 106 image or other background, and shown on a display 112. In an exemplary embodiment, display 112 is operationally related to the camera enabled mobile device 100 and portrays the augmented reality appliance image 602, along with a graphical representation of the physical location 502. In an exemplary embodiment, such augmented reality appliance image can be and or include merely labeling or augmentations on a physical appliance.

In general, such augmented reality appliance image 602, is a tailored augmented reality graphical representation that corresponds to a real world appliance 702, which is illustrated as a refrigerated cooler but can be any piece of equipment, furnishing, or other object, as may be required and/or desired in a particular embodiment.

In an exemplary embodiment, the immersive user software experience is a software tool in which a user 302 can utilize to envision what the real world appliance 702, would graphically look like as an augmented reality appliance image 602 overlaid on the graphical representation of physical location 502, as seen by camera 106, on display 112.

Use of the term "rendered appliance image" or "rendered appliance image 614", in the present invention, is intended to mean a three dimensional (3D) virtual reality (VR) graphical rendering of the real world appliance 702. Such 3D VR rendering can be displayed to the user 302, through the immersive user software experience, when the augmented reality target 604 is not viewable or recognizable by way of processed images from camera 106. In this regard, whether the camera sees the augmented reality target 604 and displays the augmented reality appliance image 602, representation of the appliance 702 or does not see the augmented reality target 604 and displays the rendered appliance image 614, representation of the appliance 702, the user experience is enriched and continuous, toggling between the augmented reality and the rendered appliance views.

Use of the term "immersive user software experience", in the present invention, is intended to mean a software program, software application, or remote data processing resource 202 accessible software also referred to as a cloud solution or software as a service (SaaS) solution that is usable by a user 302. Such a software application can be downloaded or otherwise transferred onto the camera enabled mobile device 100 and encoded in the microprocessor readable memory 104. In general, such immersive user software experience can be triggered, woken up, started, or otherwise initiated when processing of a camera 106 image recognizes an augmented reality target 604. Such triggering can cause the immersive user software experience to initiate or otherwise load and begin microprocessor execution of instructions.

Use of the term "augmented reality target" or "augmented reality target 604", in the present invention, is intended to mean a unique graphical representation embodied on paper 612, other medium, or embodied as a shape recognizable within the physical location 502 also referred to as an invisible, also referred to as markerless, augmented reality target, that can be relied on for initiating the immersive user software experience when processing of a camera 106 image recognizes an augmented reality target 604. In general, such invisible or markerless tracking utilizes unique graphical representation embodied as a shape recognizable within the physical location. Such invisible or markerless augmented reality targets commonly utilize techniques of finding small unique features on the surface of the object and saving a 3D VR pattern of those features.

In an exemplary embodiment, once initiated and an augmented reality target 604 recognized causing initiation of the immersive user software experience, the augmented reality appliance images 602 and the rendered appliance images 614, associated with the augmented reality target 604 can be determined. In this regard, the augmented reality target 604 can be unique and associated with a real world appliance 702. Correspondingly, the real world appliance 702 can have at least one of an augmented reality appliance image 602 and at least one of a rendered appliance image 614 associated with the real world appliance 702 and the augmented reality target 604.

In operation, in an exemplary embodiment, the viewing mode then toggles between an augmented reality image viewing mode 404A, label 'A', 'AR' motion arrow 402, when the camera 106 acquires or otherwise recognizes the augmented reality target 604 and toggles to the rendered image viewing mode 404B, label 'B', 'Render' motion arrow 402, when the camera 106 loses recognition of the augmented reality target 604. For disclosure purposes, motion arrow 402 is an indication of the camera enabled mobile device 100 moving towards augmented reality image viewing mode 404A, 'AR' viewing mode, and towards rendered image viewing mode 404B, 'Render' viewing mode.

In the regard, when the augmented reality target 604 is viewable by the camera 106, the augmented reality image viewing mode 404A, label 'A', can be effectuated by way of the immersive user software experience and the augmented reality appliance image 602 can be overlaid with the camera 106 captured image of the physical location 502 and be presented to and viewable by the user 302, on the display 112.

In the alternative, the rendered image viewing mode 404B, label 'B' can be effectuated by way of the immersive user software experience and the rendered appliance image 614 can be presented to and viewable by the user 302, on the display 112, when the augmented reality target is not viewable or recognized by camera 106.

The user 302 can then be engendered to interact with the immersive user software experience and selectively adjust at least one of an experience parameter. In an exemplary embodiment, when a user 302 changes an experience parameter that parameter becomes utilized in both the augmented reality image viewing mode 602 and the rendered image viewing mode 614.

As example and not a limitation, and as illustrated in at least FIG. 1, a floating label 624 is allowed to be positioned and affixed on the augmented reality appliance image 602. As a result of placing the floating label 624 on the augmented reality appliance image 602, the floating label 624 is affixed in the same location on the rendered appliance image 614, wherein the floating label 624 is viewable in both the augmented reality image viewing mode 404A and the rendered image viewing mode 404B. Similarly, artifacts and floating labels initially placed on the rendered appliance image 614 will likewise appear of the augmented reality appliance image 602.

Use of the term "artifact", in the present invention, is intended to mean an object, such as a floating label, comment, graphic image, and other similar types and/or kinds of graphic representations that are positioned on the image being displayed.

Use of the term "floating label", in the present invention, is intended to mean a bubble or label that is attached by a lead-line to a reference point of a graphic image and the bubble or label portion is allowed to float off the periphery of the graphic image, out of the way of the main subject matter. In this regard, as the image perspective is changed, or the sizes of the image changes, the floating labels are automatically repositioned away from the main subject matter so the user's view is not blocked.

In an exemplary embodiment, experience parameters can be accessed by way of the user 302 touching a button 608 or touching the touch screen 110, and/or utilizing the arrow slider 606 to access options and manipulate the images being visualized on display 112.

In an exemplary embodiment, an experience parameter can be color changing attribute of the displayed graphical representation 602 and 614 of the appliance 702. Such color change ability enables the user 302 and/or customers to view the appliance 702 representations in different colors and view graphically how the appliance would in the context of the physical location 502.

In another exemplary embodiment, as example and not a limitation, the experience parameter can be utilized to graphically add consumer products 616 to the augmented reality appliance images 602 and rendered appliance images 614, as to allow the user 302 and/or customers to visualize how consumer products will look in the appliance 702. Such feature can be expanded to include placing consumer products 616 on virtual store shelves, tools or supplies on virtual shelves, and other types and/or kinds or visualizations, as may be required and/or desired in a particular embodiment.

In another exemplary embodiment, the experience parameters can include taking a picture/images 628 of what is being displayed on the camera enabled mobile device 100, emailing or otherwise data communicating the picture/images 628, voice, text, or other data to a remote location 202/206, changing the language utilized in the immersive user software experience to engage the user 302 and/or a customer, configuring geo-location parameters, engaging in a remote attendant assisted session, authorizing access control of the camera enabled mobile device to the remote attendant, and/or configuring other types and/or kinds of experience parameters, as may be required and/or desired in a particular embodiment.

In another exemplary embodiment, the experience parameters can include arrow slider 606, which can be utilized to allow the user 302 to slidably position and reaffix the augmented reality appliance image 602 on the display 112, in a manner, as to allow the user 302 to graphically reposition the augmented reality appliance image 602 within the physical location 502. This could also be possible in a 'frozen' version of the experience where the image stays the same but the user can move the item and/or make other experience changes.

In an exemplary embodiment, once the augmented reality target 604 is acquired by the camera 106 and the augmented reality appliance image 602, representation of an appliance 702, is placed on the display 112, the augmented reality appliance image 602 may initially be positioned in what might appears to be a random location. Though not random, the augmented reality appliance image 602 is place in relationship to the augmented reality target 604 and thus may not appear in the desired location on display 112.

To correct the location of the augmented reality appliance image 602, arrow slider 606 can be touched in the appropriate direction to nudge the augmented reality appliance image 602 into the correct location, within the graphical physical location 502, on display 112. The augmented reality appliance image 602, representation of an appliance 702, can be repositioned and reaffixed to a new location.

The user 302 can then move the camera enabled mobile device around, while remaining in augmented reality image viewing mode, label 'A', as to inspect and more intricately view the augmented reality appliance image 602 image, even zooming 'In' and 'Out' by moving closer and further from the augmented reality appliance image 602, as may be required and/or desired in a particular embodiment.

In other exemplary embodiments, the user 302 can in combination with changing colors, aesthetic features, language, taking pictures/images, data communicating remotely, communicating with a remote attendant 802, and exploiting other experience parameters, create a custom experience and use such experience to promote sale, service, and other activities with customers, as may be required and/or desired in a particular embodiment.

In addition, the user 302 can adjust experience parameters to change the type of appliance 702 graphical represented. In this regard, there may be a group of appliances 702, for example and not a limitation a small, medium, and large version of the appliance 702 or model versions for the one country and different versions for another country in a library that the user 302 may want to experiment with visualizing and changing experience parameters. As such, the user 302 can change the experience parameters, such as touching an appliance selection button 114, or touching the touch screen 110 to step through and display different augmented reality appliance images 602 and rendered appliance images 614 of different model types of appliances 702.

Figure 2:
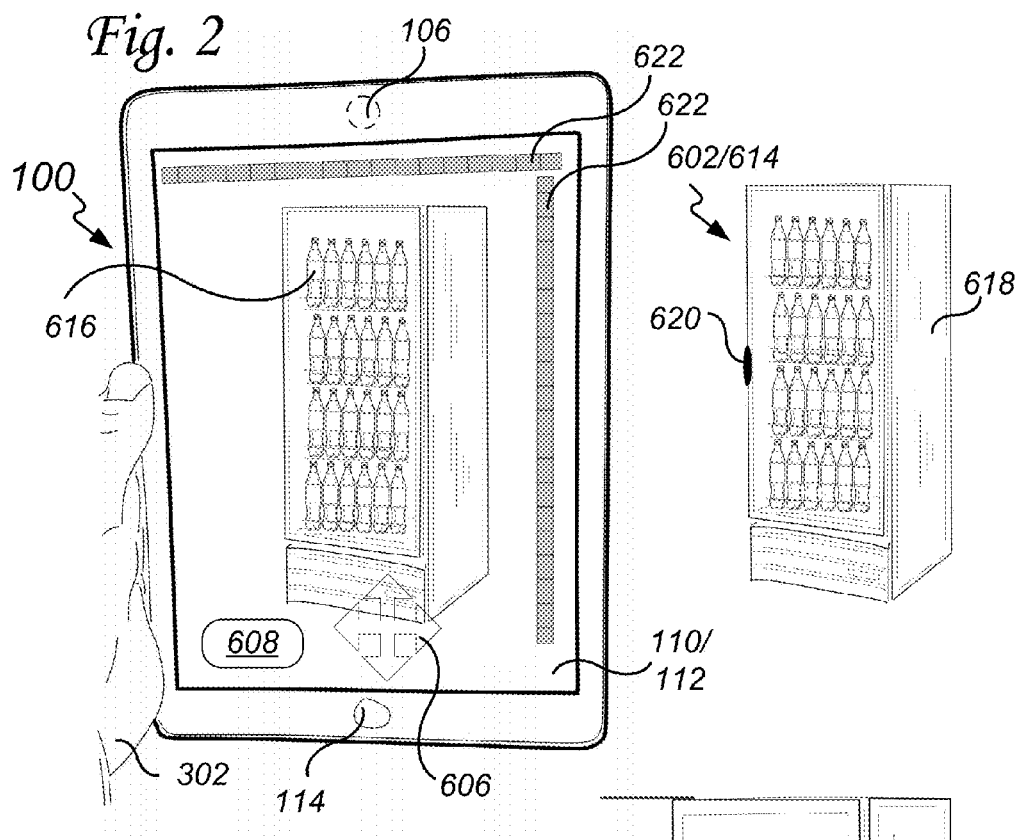
FIG. 2 illustrates one example of allowing the user to exploit certain of the experience parameters as to place additional consumer products through imagery into the augmented reality appliance images and experiment with various aesthetic visualizations.

Referring to FIG. 2 there is illustrated one example of allowing the user to exploit certain of the experience parameters, as to place additional consumer products through imagery into the augmented reality appliance images and experiment with various aesthetic visualizations. In an exemplary embodiment, experience parameters can include the ability to place graphical consumer products 616 into the augmented reality appliance images 602 or rendered appliance images 614 to visualize how products would look, on display, at a physical location 502.

In another exemplary embodiment, for example and not a limitation, the experience parameters can include decorative exterior panels 618, interior shelves, handles 620, and assemblies for other system types, such as ice makers, motor assemblies, and other types and/or kinds of assemblies, as may be required and/or desired in a particular embodiment. In this regard, there can be many options for configuring or embellishing the physical appliance 702 and by changing different experience parameters the user 302 and/or customer can experiment graphically with the various configuration options and changeable aesthetic qualities of the real world appliance 702, by way of augmented reality appliance images 602 and rendered appliance images 614.

Such various configurations and changeable aesthetic qualities of the physical appliance 702 can be effectuated as experience parameters and be tailored to a particular embodiment to convey visually the appearance and fitment within the physical location 502 of appliance 702.

In another exemplary embodiment, a ruler 622 can be toggled, manually 'On' and 'Off'. In this regard, a ruler 622 overlay can be effectuated to assist the user's ability to measure distance, on display 112, of the physical location 502 in context with the augmented reality image 602. Such a feature can be invoked, by way of, the user 302 pressing a button 114 or a touch screen 110. Accuracy of the ruler 622 determined distances can be in the range of plus or minus one centimeter utilizing the TARGET TO APPLIANCE RATIO scale, CAMERA DETERMINED TARGET SIZE, and RATIO SCALED, as better illustrated in at least FIG. 3.

Referring to FIG. 3 there is illustrated one example of an appliance 702 and ratio measurements with the augmented reality target 604. Such is a real world appliance 702 by which the augmented reality appliance images 602 and rendered appliance images 614 are created to represent graphically. In an exemplary embodiment, a real world appliance 702 can be any piece of equipment such as a refrigerated cooler, stove, motor, pipe assembly, chair, or desk. Generally, any type or kind of furnishing, equipment, or other object, can be considered an appliance 702, as may be required and/or desired in a particular embodiment.

Each of the real world appliances 702 can be uniquely associated with an augmented reality target 604. In addition, the real world appliance 702 and the augmented reality target 604 can be dimensionally precisely measured. In this regard, a TARGET TO APPLIANCE RATIO of dimensions can be determined between the augmented reality target 604 and the real world appliance 702.

In an exemplary embodiment, the significance of the TARGET TO APPLIANCE RATIO, and an advantage in the present invention, is that when the camera 106 recognizes the augmented reality target 604 a CAMERA DETERMINED TARGET SIZE determination can made, by the microprocessor 102, of the dimensions of the augmented reality target 604, as seen by the camera 106. Once the CAMERA DETERMINED TARGET SIZE of the augmented reality target 604 in determined the augmented reality appliance images 602 and optionally the rendered appliance images 614 can be RATIO SCALED by the TARGET TO APPLIANCE RATIO so that the augmented reality appliance images 602 or optionally the rendered appliance images 614 appear graphically in proportion, within the graphical physical location 502, as compared to the other objects in the graphical representation. This is how the dimensions of the real world appliance 702 would appear, if the real world appliance 702 would be placed in the physical location 502 and viewed on display 112 by camera 106.

Such technique has been demonstrated to be plus or minus one centimeter accurate when comparing the real world appliance 702 dimensions versus the augmented reality appliance images 602 RATIO SCALED dimensions. An advantage is that the user 302 has a very accurate representation of the true dimensions of the graphically generated augmented reality appliance images 602 and optionally the rendered appliance images 614 effectuating the ability to better check dimensional fitment like length, width, and height, graphically, within the physical location 502.

In such exemplary embodiments, the TARGET TO APPLIANCE RATIO can be determined either by a ratio between the size of the appliance versus the measure size of the augmented reality target 640 as determined by the camera enabled mobile device 100, labeled '1' in at least FIG. 3. Alternatively, the TARGET TO APPLIANCE RATIO can be determined by determining the distance between the augmented reality target and the camera enabled mobile device 100, labeled '2' in at least FIG. 3. Such distance between augmented reality target and the camera enabled mobile device 100 can be used to determine and scale the augmented reality appliance images 602 accordingly.

Figure 4:
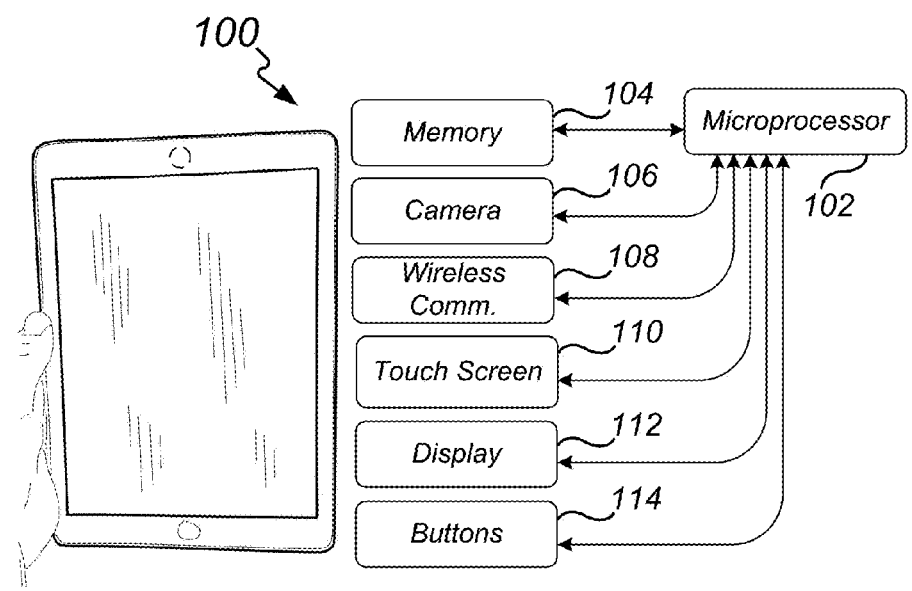
FIG. 4 illustrates one example of a camera enable mobile device system diagram.

Referring to FIG. 4 there is illustrated one example of a camera enable mobile device 100 system diagram. In an exemplary embodiment, for example and not a limitation, the camera enabled mobile device 100 can be a smart phone, tablet computer, laptop computer, IPAD, IPHONE, ANDROID based phone, ANDROID based tablet computer, GOOGLE CHROME BOOK tablet computer, MICROSOFT SURFACE tablet computer, NOKIA/MICROSOFT smart phone, HTC smart phone, wearable devices, SAMSUNG smart phone or tablet computer, and/or other similar types and/or kinds of wireless phones, laptop computers, tablet computers, and/or camera enabled mobile devices, as may be required and/or desired in a particular embodiment.

In an exemplary embodiment, these camera enabled mobile devices 100 can comprise a microprocessor 102 and a microprocessor readable memory 104 operationally related to the microprocessor 102 so that the microprocessor readable memory 102 can be encoded with instructions that when executed perform the steps of the methods and exemplary embodiments of the present invention. In this regard, the immersive user software experience, as a collection of instructions, can be encoded in the microprocessor readable memory 101 or otherwise be made available to the microprocessor 102 so that the microprocessor 102 can execute the instructions of the immersive user software experience.

A camera 106, a wireless communication interface 108, a touch screen 110, a display 112, and at least one of a button 114 can each be operationally related to the microprocessor 102, so that a user 302 can utilize the camera enabled mobile device 100 as required and/or desired in a plurality of exemplary embodiments. Such features can be specified, procured, integrated into a design and manufactured into a working camera enabled mobile device 100 that is usable by user 302.

Such wireless communication interface can include BLUETOOTH, WI-FI, CELLULAR 3G, 4G, LTE and similar wireless network protocols, and/or other wireless communication interfaces, as may be required and/or desired in a particular embodiment.

Figure 5:
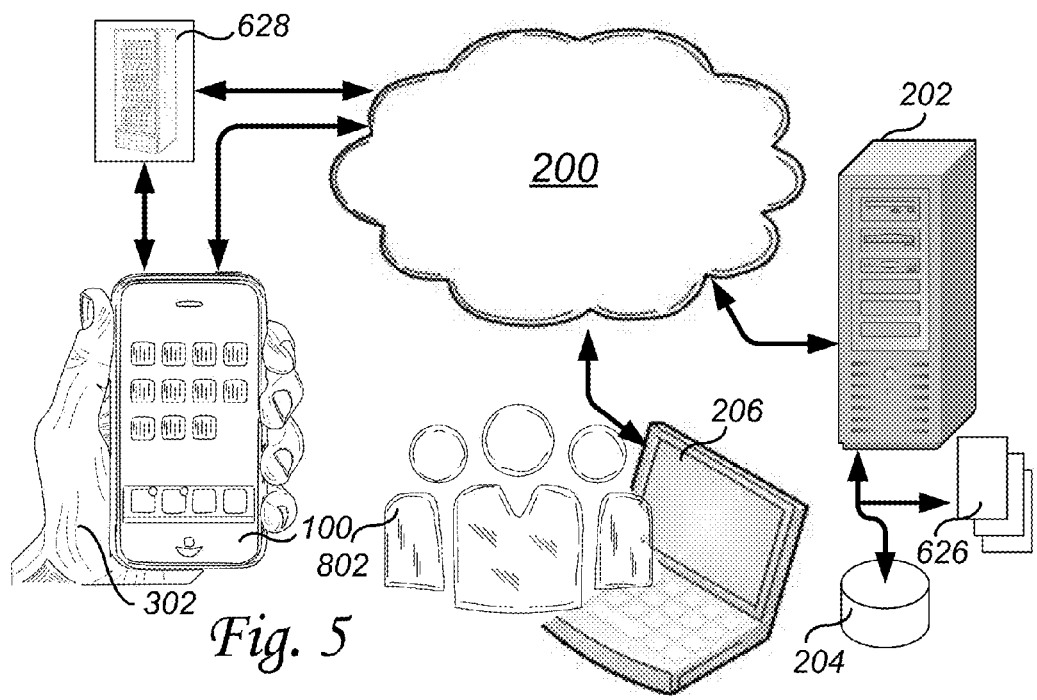
FIG. 5 illustrates one example of a camera enabled mobile device data communicating over a global network with a remote data processing resource.

Referring to FIG. 5 there is illustrated a camera enabled mobile device 100 data communicating over a global network 200 with a remote data processing resource 202 and/or data storage 204. In an exemplary embodiment, the camera enabled mobile device 100 can data communicate over a global network 200, such as the Internet, with other remote data processing resources 202 having optional data communication access with a data storage device 204, such as a memory, hard drive, solid state drive, or other type and/or kind of data storage device, as may be required and/or desired in a particular embodiment. Such a data processing resource 202 can be server, a website, a web server, mail server, or other type and/or kind of data processing resource, as may be required and/or desired in a particular embodiment. Data processing resource 202 and data storage 204 can also store electronic documents 626 or have data communication access to electronic documents 626 as well as receive and send pictures/images 628, as desired and/or required.

In addition, the camera enabled mobile device 100 can data communicate voice, text, pictures/images 628, and other data in a remote interaction with a remote attendant 802. Such remote attendant 802 can use data processing resources, such as a laptop 206 to provide support to user 302 which can include change viewing modes, taking control of the user's camera enabled mobile device 100, sharing new augmented reality appliance images 602 or new rendered appliance images 614, capture pictures/images 628 from the user, accepting orders, and effectuate other remote service functions, as may be required and/or desired in a particular embodiment.

Figure 6:
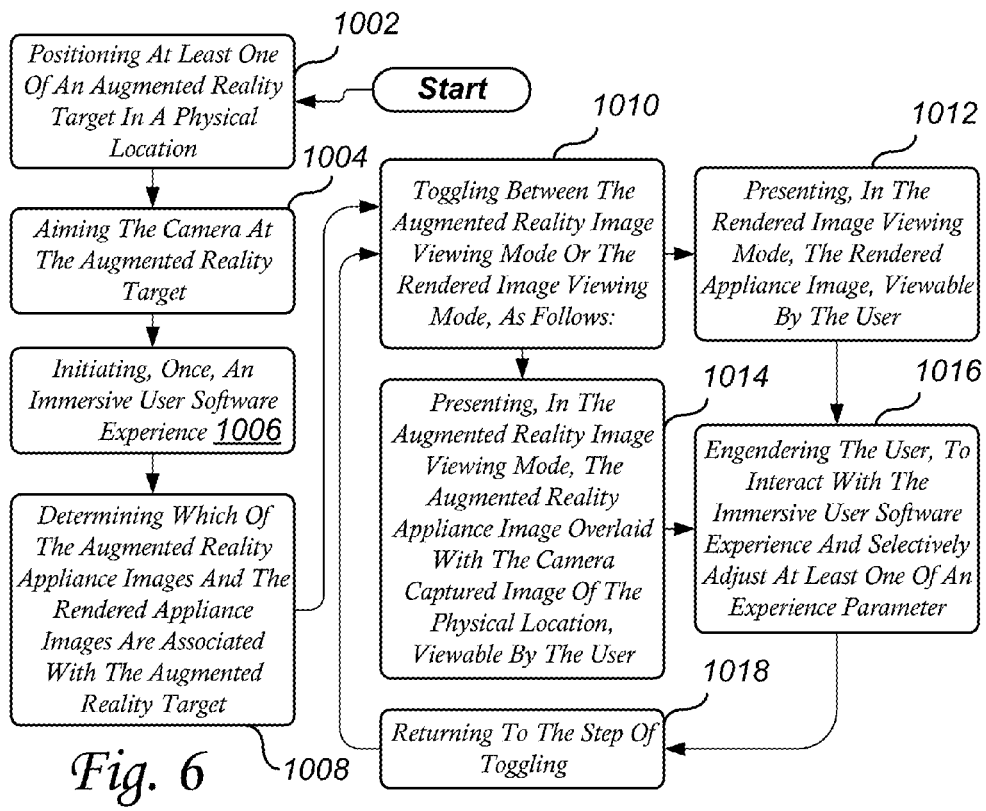
FIG. 6 illustrates one example of a method of toggling between an augmented reality image viewing mode and a rendered image viewing mode.

Referring to FIG. 6 there is illustrated one example of a method of toggling between an augmented reality image viewing mode 404A and a rendered image viewing mode 404B. In an exemplary embodiment, once the immersive user software experience is initiated by way of camera 106 acquiring or otherwise recognizing the augmented reality target 604 the immersive user software experience then toggles between an augmented reality image viewing mode 404A, labeled 'A', in at least FIG. 1 and a rendered image viewing mode 404B, labeled 'B', in at least FIG. 1. The mode being determined based, in part, on whether the camera has a line of sight 404A, which can identify and recognize the augmented reality target 604, thus entering the augmented reality image viewing mode 404A or if the camera 106 has a line of sight 404B, away from the augmented reality target 604, thus entering the rendered appliance image viewing mode. The user can then be engendered to interact with the images on display 112, as may be required and/or desired in a particular embodiment. The augmented reality target 604 can be unique and associated with at least one of an augmented reality appliance image 602, representation of an appliance 702, and at least one of a rendered appliance image 614, representation of the appliance 702. The method begins in block 1002.

In block 1002, at least one of an augmented reality target 604 is positioned in a physical location 502. The method then moves to block 1004.

In block 1004, the camera 106 is aimed at the augmented reality target 604. The method then moves to block 1006.

In block 1006, the immersive user software experience is initiated once and will then continuously engage the user 302, toggling back and forth between the augmented reality image viewing mode 404A, labeled 'A' in at least FIG. 1, and the rendered image viewing mode 404B, labeled 'B', in at least FIG. 1, and will not need to be restarted when the augmented reality target 604 is lost or otherwise not recognized by the camera 106 and then recognition of the augmented reality target 604 is regained by the camera 106. Rather, the immersive user software experience will seamlessly transition between augmented reality image viewing mode 404A and three dimensional rendered image view mode 404B to provide an enriched and continuous user experience without restart or image interruption. The method move to block 1008.

In block 1008, a determination is made as to which of the augmented reality appliance images and rendered appliance images are associated with the augmented reality target 604 responsible for initiating the immersive user software experience. In this regard, the augmented reality target 604 can be unique and can correspond to a specific or specific group of appliances 702 having corresponding augmented reality appliance images 602 and rendered appliance images 614. The method moves to block 1010.

In block 1010, the augmented image viewing mode 404A or the rendered image viewing mode 404B is toggled between based, in part, as follows in blocks 1012 and 1014. The method moves to block 1012 and 1014.

In block 1012, if the augmented reality target 604 in not in the line of site 404B of camera 106, labeled 'B', in at least FIG. 1, then the rendered image viewing mode 404B is entered and the immersive user software experience displays the rendered appliance images 614. The method moves to block 1016.

In block 1014, if the augmented reality target 604 is in the line of site 404A and recognized by camera 106, labeled 'A', in at least FIG. 1, then the augmented reality image viewing mode 404A is entered and the immersive user software experience displays the augmented reality appliance images 614. The method moves to block 1016.

In block 1016, the user can be engendered to interact with the immersive user software experience and selectively adjust at least one of an experience parameter.

In an exemplary embodiment, in combination with changing colors, aesthetic features, language, taking pictures/images 628, electronic document 626 related data communications, data communicating remotely, communicating with a remote attendant 802, and exploiting other experience parameter, as may be required and/or desired in a particular embodiment, the user can adjust experience parameters to change graphically the model type of appliance 702. In this regard, there may be a group of appliances 702, for example and not a limitation, a small, medium, and large version of the appliance 702 or model versions for the one country and different versions for another country, in a library that the user may want to experiment with visualizing and changing experience parameters. As such, the user 302 can change the experience parameters, such as touching an appliance selection button 114, or touching the touch screen 110 to step through and display different augmented reality appliance images 602 and rendered appliance images 614 of different model types of appliance 702. The method moves to block 1018.

In block 1018, the method is returned to the step of toggling, block 1010.

Figure 7:
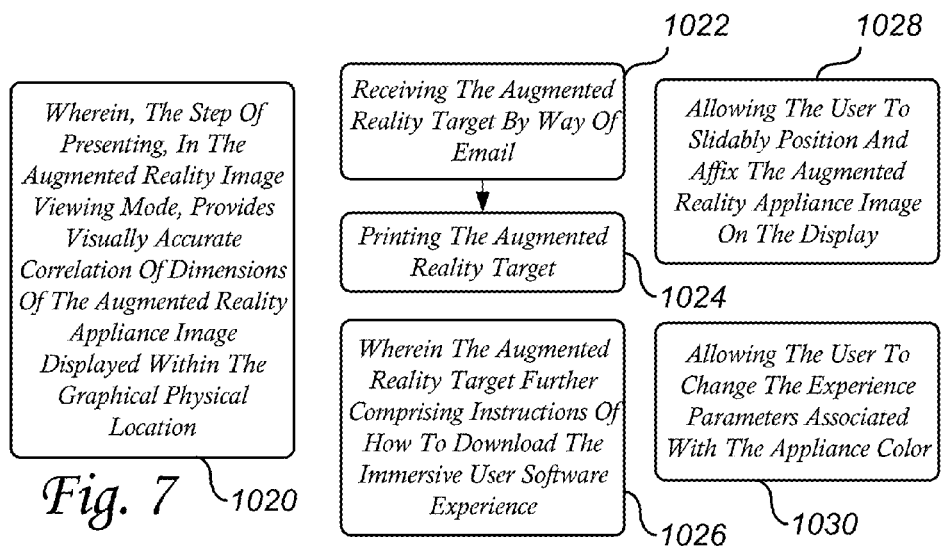
FIG. 7 illustrates exemplary embodiments of a method of toggling between an augmented reality image viewing mode and a rendered image viewing mode.

Referring to FIG. 7 there is illustrated exemplary embodiments of a method of toggling between an augmented reality image viewing mode and a rendered image viewing mode. Such exemplary embodiments can be selectively utilized with the methods of the present invention.

In block 1020, wherein in the step of presenting, in the augmented reality image viewing mode 404A, the augmented reality appliance image 602 is RATIO SCALED graphically and displayed dimensionally accurate with respect to the appliance's 702 actual dimensions with respect to objects in the physical location 502 captured by the camera 106 view, providing visually accurate correlation of dimension between the augmented reality appliance image 602 displayed within the physical location 502.

In an exemplary embodiment, RATIO SCALED has been shown to be dimensionally accurate, within a range of plus or minus one centimeter of the real world appliance 702 actual dimensions.

In block 1022, the augmented reality target 604 is received by the user 302 or the customer in an email. The method moves to block 1024.

In block 1024, the augmented reality target 604 can be printed. In this regard, the augmented reality target 604 can be emailed to the user 302 or customer and they can print the augmented reality target 604 on paper 612. The paper 610 can further comprise optional instructions 610, as may be required and/or desired in a particular embodiment.

In block 1026, wherein the augmented reality target 604 can further comprise instructions 610 of how to download the immersive user software experience for encoding within the microprocessor readable memory 104.

In block 1028, the user 302 is allowed to slidably position and reaffix the augmented reality appliance image 602 on the display 112, in a manner, as to allow the user 302 to graphically reposition the augmented reality appliance image 602 within the physical location 502.

In block 1030, the user 302 is allowed to change the experience parameter associated with the augmented reality appliance image 602 or rendered appliance image 614 graphical representation of appliance 702 color, wherein the user can envision graphically how color of the appliance 702 would appear in the physical location 502.

Figure 8:
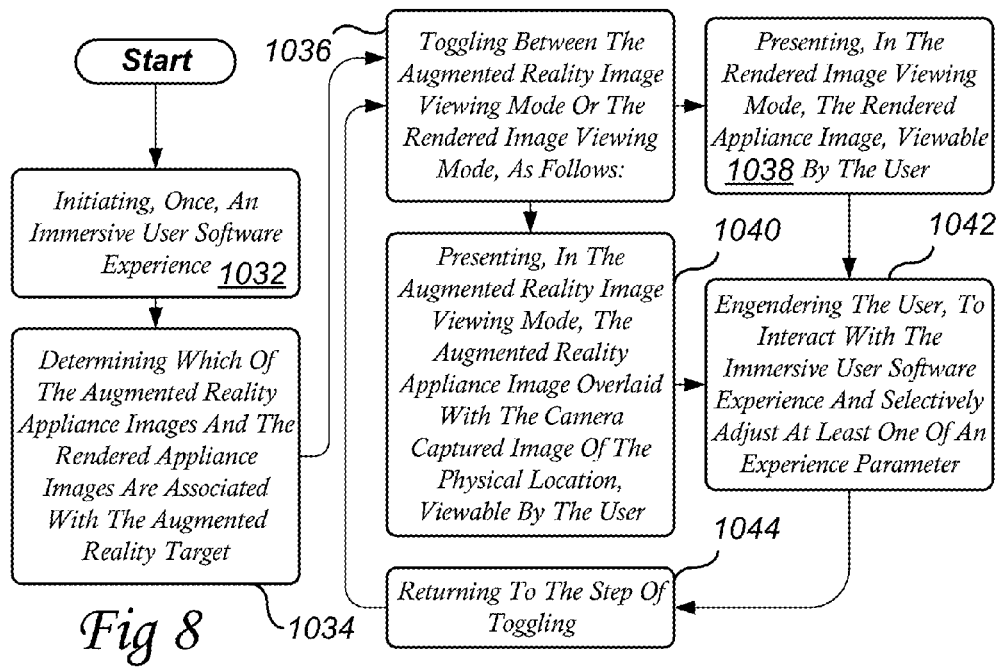
FIG. 8 illustrates one example of a method of toggling between an augmented reality image viewing mode and a rendered image viewing mode.

Referring to FIG. 8 there is illustrated one example of a method of toggling between an augmented reality image viewing mode 404A and a rendered image viewing mode 404B. In an exemplary embodiment, once the immersive user software experience is initiated by way of camera 106 acquiring or otherwise recognizing the augmented reality target 604 the immersive user software experience then toggles between an augmented reality image viewing mode 404A, labeled 'A', in at least FIG. 1 and a rendered image viewing mode 404B, labeled 'B', in at least FIG. 1. The mode being determined based, in part, on whether the camera has a line of sight 404A, which can identify and recognize the augmented reality target 604, thus entering the augmented reality image viewing mode 404A or if the camera 106 has a line of sight 404B, away from the augmented reality target 604, thus entering the rendered appliance image viewing mode. The user can then be engendered to interact with the images on display 112, as may be required and/or desired in a particular embodiment. The augmented reality target 604 can be unique and associated with at least one of an augmented reality appliance image 602, representation of an appliance 702, and at least one of a rendered appliance image 614, representation of the appliance 702. The method begins in block 1032.

In block 1032, the immersive user software experience is initiated once and will continuously engage the user toggling back and forth between the augmented reality image viewing mode 404A, labeled 'A', in at least FIG. 1, and the rendered image viewing mode 404B, labeled 'B', in at least FIG. 1, and will not need to be restarted when the augmented reality target 604 is lost or otherwise not recognized by the camera 106 and then regained. Rather, the immersive user software experience will seamlessly transition between augmented reality image viewing mode 404A and three dimensional rendered image viewing mode 404B to provide continuity to the user's experience. The method move to block 1034.

In block 1034, a determination is made as to which of the augmented reality appliance images and rendered appliance images are associated with the augmented reality target 604 responsible for initiating the immersive user software experience. In this regard, the augmented reality target 604 can be unique and can correspond to a specific or specific group of appliances 702 having corresponding augmented reality appliance images 602 and rendered appliance images 614. The method moves to block 1036.

In block 1036, the augmented image viewing mode 404A or the rendered image viewing mode 404B is toggled between based, in part, as follows in blocks 1038 and 1040. The method moves to block 1038 and 1040.

In block 1038, if the augmented reality target 604 in not in the line of site 404B of camera 106, labeled 'B', in at least FIG. 1, then the rendered image viewing mode 404B is entered and the immersive user software experience displays the rendered appliance images 614. The method moves to block 1042.

In block 1040, if the augmented reality target 604 is in the line of site 404A and recognized by camera 106, labeled 'A', in at least FIG. 1, then the augmented reality image viewing mode 404A is entered and the immersive user software experience displays the augmented reality appliance images 614. The method moves to block 1042.

In block 1042, the user can be engendered to interact with the immersive user software experience and selectively adjust at least one of an experience parameter.

In an exemplary embodiment, in combination with changing colors, aesthetic features, language, taking pictures/images 628, electron document 626 related data communications, data communicating remotely, communicating with a remote attendant 802, and exploiting other experience parameter, as may be required and/or desired in a particular embodiment, the user can adjust experience parameters to change graphically the model type of appliance 702. In this regard, there may be a group of appliances 702, for example and not a limitation, a small, medium, and large version of the appliance 702 or model versions for the one country and different versions for another country, in a library that the user may want to experiment with visualizing and changing experience parameters. As such, the user 302 can change the experience parameters, such as touching an appliance selection button 114, or touching the touch screen 110 to step through and display different augmented reality appliance images 602 and rendered appliance images 614 of different model types of appliance 702. The method moves to block 1044.

In block 1044, the method is returned to the step of toggling, block 1036.

Figure 9:
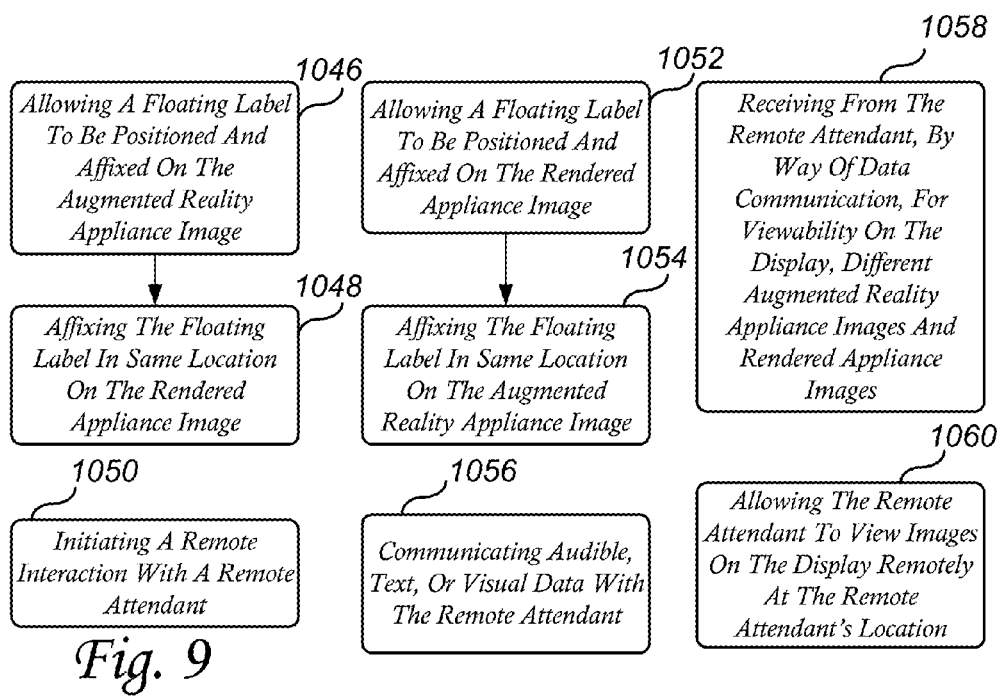
FIGS. 9, 10, and 11 illustrate exemplary embodiments of a method of toggling between an augmented reality image viewing mode and a rendered image viewing mode.

Referring to FIG. 9 there is illustrated exemplary embodiments of a method of toggling between an augmented reality image viewing mode and a rendered image viewing mode. Such exemplary embodiments can be selectively utilized with the methods of the present invention.

In block 1046, a floating label 624 is allowed to be positioned and affixed on the augmented reality appliance image 602. The method then moves to 1048.

In block 1048, the floating label 624, can be affixed, automatically, without user 302 intervention, in the same location on the rendered appliance image 614, wherein the floating label 624 is viewable in both the augmented reality image viewing mode 404A and the rendered image viewing mode 404B.

In block 1050, a remote interaction with a remote attendant 802 can be initiated. In an exemplary embodiment, the camera enabled mobile device 100 can data communicate voice, text, images, and other data in a remote interaction with a remote attendant 802. Such remote attendant 802 can use data processing resources, such as a laptop 206 to provide support to user 302 which can include change viewing modes, taking control of the user's camera enabled mobile device 100, sharing new augmented reality appliance images 602 or new rendered appliance images 614, capture pictures/images 628 from the user, accepting orders, and effectuate other remote service functions, as may be required and/or desired in a particular embodiment.

In block 1052, a floating label is allowed to be positioned and affixed on the rendered appliance image 614. The method moves to 1054.

In block 1054, the floating label 624, can be affixed, automatically, without user interactions, in same location on the augmented reality appliance image 602, wherein the floating label 624 is viewable in both the augmented reality image viewing mode 404A and the rendered image viewing mode 404B.

In block 1056, audible, text, data, or visual data can be communicated over a global network 200, such as the Internet, with the remote attendant 802. In this regard, the user 302 and the remote attendant 802 can communicate as necessary and in audible, text, data, or visual data formats, as may be required and/or desired in a particular embodiment.

In block 1058, by way of data communication over a global network 200, such as the Internet, can be received from the remote attendant 802 for viewability on the display 112, including the reception for viewing of different augmented reality appliance images 602 and/or the rendered appliance images 614. In this regard, the remote attendant 802 can see, receive, and send augmented reality appliance images 602 and/or the rendered appliance images 614 between the user 302 and the remote attendant's 802, data processing resource, such as laptop 206.

In block 1060, the remote attendant 802 is allowed to view images on the user's display 112, remotely, at the remote attendant's 802 location.

Figure 10:
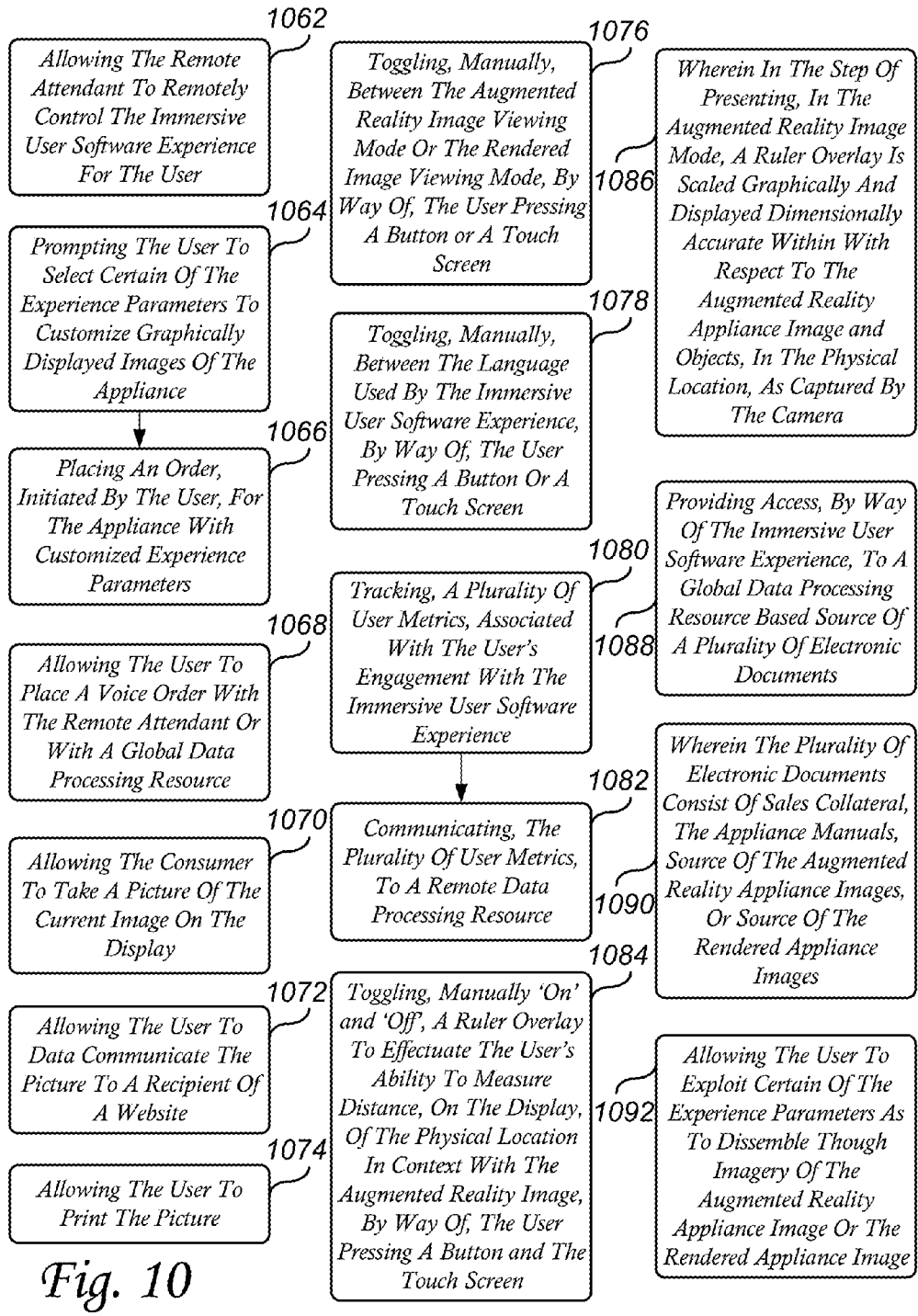

Referring to FIG. 10 there is illustrated exemplary embodiments of a method of toggling between an augmented reality image viewing mode 404A and a rendered image viewing mode 404B. Such exemplary embodiments can be selectively utilized with the methods of the present invention.

In block 1062, the remote attendant 802 is allowed to remotely control the immersive user software experience for the user 302.

In block 1064, the user is prompted to select certain of the experience parameters to customize graphically displayed images of the appliance 702. The method moves to block 1066.

In block 1066, an order for goods or services can be placed, initiated by the user 302, associated with the appliance 702, and optionally inclusive of customized experience parameters, such as decorative exterior panels 618, interior shelves, handles 620, and assemblies with other system types, such as ice makers, motor assemblies, and other types and/or kinds of items, as may be required and/or desired in a particular embodiment.

In block 1068, the user 302 is allowed to place a voice order with the remote attendant 802, a global data processing resource 202, or with a remote attendant 802.

In block 1070, the user is allowed to take a picture/image 628 of the current image on the display 112.

In block 1072, the user 302 is allowed to data communicate over a global network, such as the Internet, the picture/image 628 to a recipient, a website, or a server. Such a recipient can be an email account, website, server or database, and/or other data processing devices that are accessible by another person or community of people in an online manner.

In block 1074, the user 302 is allowed to print the picture/image 628.

In block 1076, by way of, the user 302 pressing a button 114 or a touch screen 110, the user 302 can toggle, manually, between the augmented reality image viewing mode 404A and the rendered image viewing mode 404B.

In block 1078, by way of, the user 302 pressing a button 114 or a touch screen 110, the user 302 can toggle, manually, between the languages used by the immersive user software experience.

In block 1080, a plurality of user 302 metrics, can be tracked which are associated with the user's 302 engagement with the immersive user software experience. The method moves to block 1082.

In block 1082, the plurality of user 302 metrics, can be data communicated to a remote data processing resource 202 or 206. In this regard, as the user 302 utilizes the immersive user software experience the types and kind of activities the user 302 looks at, select as experience parameters, time, date, and location the immersive user software experience, and other types and/or kinds of user 302 metrics can be identified, captured, stored, data communicate to remote data processing resources 202 and 206, and/or otherwise be utilized to better understand the user 302 and inform on ways to improve the immersive user software experience, as well as be used for other purposes, as may be required and/or desired in particular embodiment.

In block 1084, a ruler overlay can be toggled by the user 302, manually, 'On' and 'Off' to effectuate the user's 302 ability to measure distances, on the display 112, of the graphical representation of the physical location 502 in context with the augmented reality image 602, by way of, the user pressing a button 114 or a touch screen 110.

In block 1086, wherein in the step of presenting in blocks 1014 and 1040, in the augmented reality image viewing mode 602, a ruler 622 overlay is scaled graphically and displayed dimensionally accurate with respect to the augmented reality appliance image 602 and objects, in the graphical representation of the physical location 502, as captured by the camera 106 view, providing visually accurate correlation of the ruler 622 dimensions and images displayed, on the display 112, within the physical location 502.

In block 1088, by way of the immersive user software experience, access is provided to a global data processing resource 202 based source of a plurality of electronic documents 626. In an exemplary embodiment, a plurality of electronic documents 626 can be specifications, manuals, images, market materials, brochures, and/or other types and/or kinds of electronic documents, as may be required and/or desired in a particular embodiment. Such electronic documents can be made accessible by way of the immersive user software experience having data communication access to the remote data processing resource 202 and/or data storage 204, over a global network 200, such as the Internet.

In block 1090, wherein the plurality of electronic documents 626 consists of sales collateral, the appliance manuals, the augmented reality appliance images, or the rendered appliance images.

In block 1092, the user 302 can be allowed to exploit certain of the experience parameters as to dissemble through imagery the augmented reality appliance images 602 or the rendered appliance images 614, as a way of seeing inside the appliance or removing layers to see additional features of the appliance.

Figure 11:
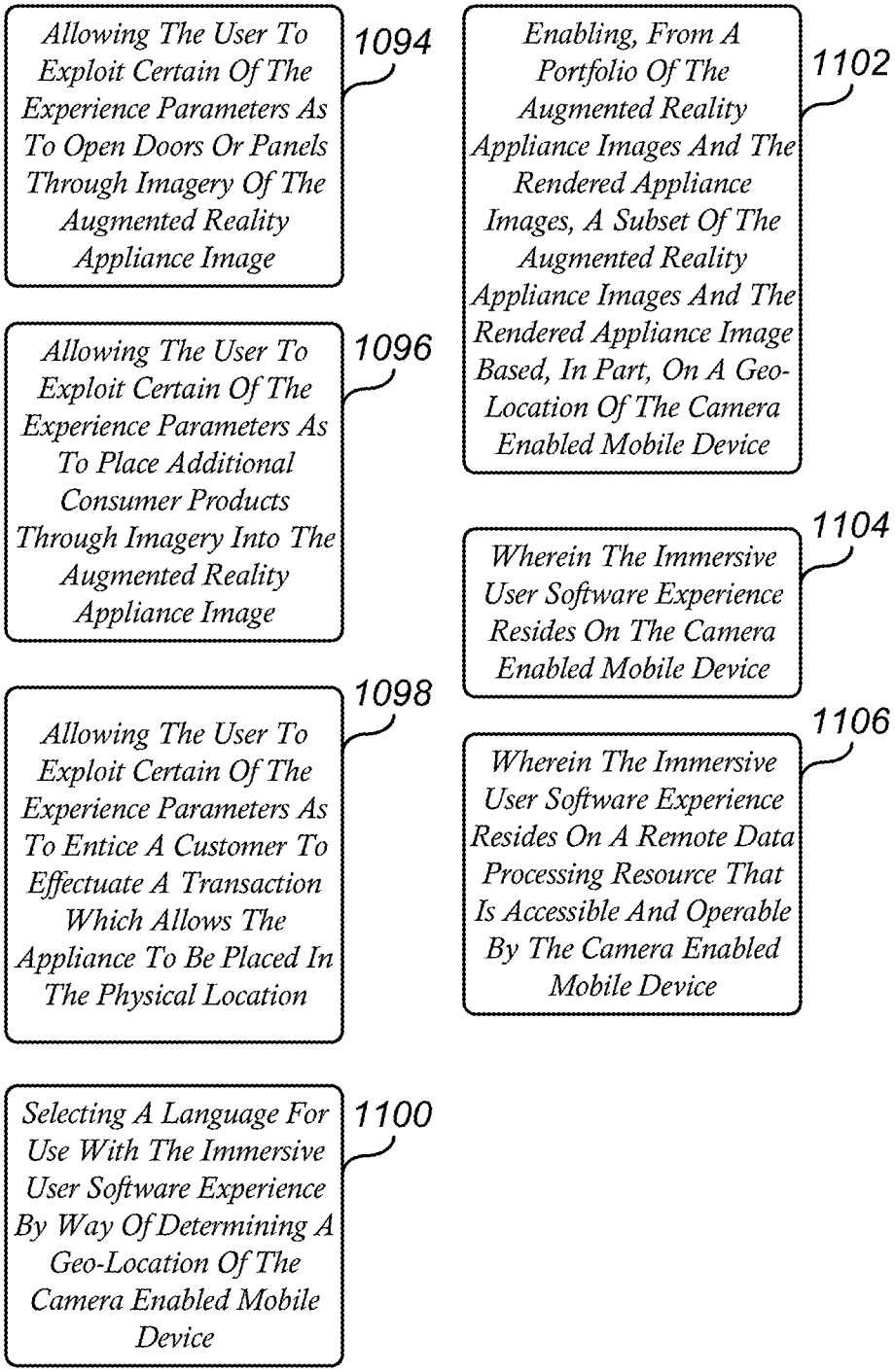

Referring to FIG. 11 there is illustrated exemplary embodiments of a method of toggling between an augmented reality image viewing mode 404A and a rendered image viewing mode 404B. Such exemplary embodiments can be selectively utilized with the methods of the present invention.

In block 1094, the user 302 can be allowed to exploit certain of the experience parameters as to graphically open doors or panels through imagery of the augmented reality appliance images 602.

In block 1096, the user 302 can be allowed to exploit certain of the experience parameters as to place consumer products 616 through imagery into the augmented reality appliance image 602, wherein the user can visualize on the display 112 what the appliance would look like, in the physical location 502, stocked with the consumer products 616.

In block 1098, the user can be allowed to exploit certain of the experience parameters as to entice a customer to effectuate a transaction which allows the appliance to be placed in the physical location 502 by visualizing, on the display 112, through the use of the augmented reality appliance images 602 what the appliance would look like in the physical location 502. In this regard, a transaction can be an order, invoice, credit card purchase, or request for sales call follow-up, a request for more information, coupon and loyalty promotions, and/or other types and/or kinds of transactions, as may be required and/or desired in a particular embodiment.

In block 1100, a language can be selected for use with the immersive user software experience by way of determining a geo-location of the camera enabled mobile device 100 and associating the geo-location with the language. In this regard, as an example and not a limitation, if geo-location indicates the camera enabled mobile device 100 is in France then a default language of French can be selected.

In block 1102, from a portfolio of the augmented reality appliance images 602 and the rendered appliance images 614, a subset of the augmented reality appliance images 602 and the rendered appliance images 614 can be enabled for use based, in part, on the geo-location of the camera enabled mobile device 100. In this regard, if model 'T' appliances 702 are sold in Germany and model 'Z' appliances are sold in Canada, then if geo-location indicates the camera enabled mobile device 100 is in Canada then a model 'Z' subset of augmented reality appliance images 602 and the rendered appliance images 614, will be selected or otherwise enabled for use and visualization.

In block 1104, wherein the immersive user software experience resides on the camera enabled mobile device 100.

In block 1106, wherein the immersive user software experience resides on a remote data processing resource 202 that is accessible and operable by the camera enabled mobile device 100.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of toggling between an augmented reality image viewing mode and a rendered image viewing mode based, in part, on viewability of an augmented reality target proximate a camera enabled mobile device, the method comprising the steps of:
   positioning at least one of an augmented reality target in a physical location, each of the augmented reality targets is uniquely associated with at least one of an augmented reality appliance image representation of an appliance and at least one of a rendered appliance image representation of the appliance, the camera enabled mobile device further comprising a microprocessor, a camera, and a display, the camera and the display are operationally related to the microprocessor;
   aiming the camera at the augmented reality target;
   initiating, once, an immersive user software experience, by way of the camera detection of the augmented reality target within the physical location, wherein the immersive user software experience becomes operable by a user;
   determining which of the augmented reality appliance images and the rendered appliance images are associated with the augmented reality target;
   toggling between the augmented reality image viewing mode and the rendered image viewing mode, as follows:
      presenting, in the augmented reality image viewing mode, the augmented reality appliance image overlaid with the camera captured image of the physical location, viewable by the user, on the display, when the augmented reality target is viewable by the camera; or
      presenting, in the rendered image viewing mode, the rendered appliance image viewable by the user, on the display, when the augmented reality target is not viewable by the camera;
   engendering the user to interact with the immersive user software experience and selectively adjust at least one of an experience parameter; and
   returning to the step of toggling.

2. The method in accordance with claim 1, wherein in the step of presenting, in the augmented reality image viewing mode, the augmented reality appliance image is RATIO SCALED graphically and displayed dimensionally accurate with respect to the appliance's actual dimensions with respect to objects in the physical location captured by the camera view, providing visually accurate correlation of dimension between the augmented reality appliance image displayed within the physical location.

3. The method in accordance with claim 1, further comprising:
   receiving by the user or customer the augmented reality target by way of email; and
   printing the augmented reality target.

4. The method in accordance with claim 1, the step of engendering further comprising:
   allowing the user to slidably position the augmented reality appliance image on the display, in a manner, as to allow the user to graphically reposition the augmented reality appliance image within the physical location.

5. The method in accordance with claim 1, the step of engendering further comprising:
   allowing the user to change the experience parameter associated with the augmented reality appliance image or the rendered appliance image graphical representation of the appliance color, wherein the user can envision how color of the appliance would appear in the physical location.

6. The method in accordance with claim 1, the step of engendering further comprising:
allowing a floating label to be positioned and affixed on the augmented reality appliance image; and
affixing, automatically, without intervention by the user, the floating label in same location on the rendered appliance image, wherein the floating label is viewable in both the augmented reality image viewing mode and the rendered image viewing mode.

7. The method in accordance with claim 1, the step of engendering further comprising:
initiating a remote interaction with a remote attendant;
communicating audible, text, data, or visual data with the remote attendant;
allowing the remote attendant to view images on the display remotely at the remote attendant's location;
receiving from the remote attendant, by way of data communication, for viewability on the display, different at least one the augmented reality appliance images or at least one of the rendered appliance images; and
allowing the remote attendant to remotely control the immersive user software experience for the user.

8. The method in accordance with claim 1, the step of engendering further comprising:
prompting the user to select certain of the experience parameters to customize graphically displayed images of the appliance; and
placing an order, initiated by the user, for the appliance with customized experience parameters.

9. The method in accordance with claim 7, the step of engendering further comprising:
allowing the user to place a voice order with the remote attendant or with a global data processing resource.

10. The method in accordance with claim 1, the step of engendering further comprising at least one of the following steps:
allowing the user to take a picture of the current image on the display;
allowing the user to print the picture;
allowing the user to data communicate the picture to a recipient, a website, or a server.

11. The method in accordance with claim 1, the step of engendering further comprising:
toggling, manually, between the augmented reality image viewing mode and the rendered image viewing mode, by way of, the user pressing a button or a touch screen, the camera enabled mobile device further comprising the button and the touch screen each operationally related to the microprocessor.

12. The method in accordance with claim 1, the step of engendering further comprising:
toggling, manually, between the languages used by the immersive user software experience, by way of, the user pressing a button or a touch screen, the camera enabled mobile device further comprising the button and the touch screen each operationally related to the microprocessor.

13. The method in accordance with claim 1, the step of engendering further comprising:
tracking, a plurality of user metrics, associated with the user's engagement with the immersive user software experience;
communicating, the plurality of user metrics, to a remote data processing resource.

14. The method in accordance with claim 1, the step of engendering further comprising:
toggling, manually 'On' and 'Off', a ruler overlay to effectuate the user's ability to measure distance, on the display, of the physical location in context with the augmented reality image, by way of, the user pressing a button or a touch screen, the camera enabled mobile device further comprising the button and the touch screen each operationally related to the microprocessor.

15. The method in accordance with claim 1, wherein in the step of presenting, in the augmented reality image viewing mode, a ruler overlay is scaled graphically and displayed dimensionally accurate with respect to the augmented reality appliance image and objects, in the physical location, as captured by the camera view, providing visually accurate correlation of the ruler overly dimensions and image displayed, on the display, within the physical location.

16. The method in accordance with claim 1, the step of engendering further comprising:
providing access, by way of the immersive user software experience, to a global data processing resource based source of a plurality of electronic documents, wherein the plurality of electronic documents consist of sales collateral, the appliance manuals, the augmented reality appliance images, or the rendered appliance images.

17. The method in accordance with claim 1, the step of engendering further comprising at least one of the following steps:
allowing the user to exploit certain of the experience parameters as to dissemble through imagery the augmented reality appliance images or the rendered appliance images;
allowing the user to exploit certain of the experience parameters as to open doors or panels through imagery of the augmented reality appliance images;
allowing the user to exploit certain of the experience parameters as to place consumer products through imagery into the augmented reality appliance image, wherein the user can visualize on the display what the appliance would look like, in the physical location, stocked with the consumer products; or
allowing the user to exploit certain of the experience parameters as to entice a customer to effectuate a transaction which allows the appliance to be placed in the physical location by visualizing, on the display, through the use of the augmented reality appliance images what the appliance would look like in the physical location.

18. The method in accordance with claim 1, the step of initiating further comprising:
selecting a language for use with the immersive user software experience by way of determining a geo-location of the camera enabled mobile device and associating the geo-location with the language.

19. The method in accordance with claim 1, the step of initiating further comprising:
enabling, from a portfolio of the augmented reality appliance images and the rendered appliance images, a subset of the augmented reality appliance images and the rendered appliance image based, in part, on a geo-location of the camera enabled mobile device.

20. The method in accordance with claim 1, wherein the immersive user software experience resides on the camera enabled mobile device.

21. The method in accordance with claim 1, wherein the immersive user software experience resides on a remote data processing resource that is accessible and operable by the camera enabled mobile device.

22. A camera enabled mobile device toggles between an augmented reality image viewing mode and a rendered image viewing mode based, in part, on viewability of an augmented reality target proximate the camera enabled mobile device, the camera enabled mobile device comprising:
  a microprocessor;
  a display operationally related with the microprocessor;
  a camera operationally related with the microprocessor; and
  a microprocessor readable memory, the microprocessor readable memory is encoded with instructions that when executed perform the steps of:
    initiating, once, an immersive user software experience, by way of the camera detection of the augmented reality target within a physical location, wherein the immersive user software experience becomes operable by a user, each of the augmented reality targets is uniquely associated with at least one of an augmented reality appliance image representation of an appliance and at least one of a rendered appliance image representation of the appliance;
    determining which of the augmented reality appliance images and the rendered appliance images are associated with the augmented reality target;
    toggling between the augmented reality image viewing mode and the rendered image viewing mode, as follows:
      presenting, in the augmented reality image viewing mode, the augmented reality appliance image overlaid with the camera captured image of the physical location, viewable by the user, on the display, when the augmented reality target is viewable by the camera; or
      presenting, in the rendered image viewing mode, the rendered appliance image viewable by the user, on the display, when the augmented reality target is not viewable by the camera;
    engendering the user to interact with the immersive user software experience and selectively adjust at least one of an experience parameter; and
    returning to the step of toggling.

23. A method of toggling between an augmented reality image viewing mode and a rendered image viewing mode based, in part, on viewability of an augmented reality target proximate a camera enabled mobile device, the method comprising the steps of:
  positioning at least one of an augmented reality target in a physical location, each of the augmented reality targets is uniquely associated with at least one of an augmented reality appliance image representation of an appliance and at least one of a rendered appliance image representation of the appliance, the camera equipped mobile device further comprising a microprocessor, a camera, and a display, the camera and the display are operationally related to the microprocessor;
  aiming the camera at the augmented reality target;
  initiating, once, an immersive user software experience, by way of the camera detection of the augmented reality target within the physical location, wherein the immersive user software experience becomes operable by a user;
  determining which of the augmented reality appliance images and the rendered appliance images are associated with the augmented reality target;
  toggling between the augmented reality image viewing mode and the rendered image viewing mode, as follows:
    presenting, in the augmented reality image viewing mode, the augmented reality appliance image overlaid with the camera captured image of the physical location, viewable by the user, on the display, when the augmented reality target is viewable by the camera; or
    presenting, in the rendered image viewing mode, the rendered appliance image viewable by the user, on the display, when the augmented reality target is not viewable by the camera;
  engendering the user to interact with the immersive user software experience and selectively adjust at least one of an experience parameter, the step of engendering further comprising:
    allowing a floating label to be positioned and affixed on the rendered appliance image; and
    affixing, automatically, without intervention by the user, the floating label in same location on the augmented reality appliance image, wherein the floating label is viewable in both the augmented reality image viewing mode and the rendered image viewing mode;
  allowing the user to exploit certain of the experience parameters as to entice a customer to effectuate a transaction which allows the appliance to be placed in the physical location by visualizing, on the display, through the use of the augmented reality appliance images what the appliance would look like in the physical location; and
  returning to the step of toggling.

* * * * *